United States Patent [19]
Kondou et al.

[11] Patent Number: 5,527,837
[45] Date of Patent: Jun. 18, 1996

[54] HEAT-CURABLE SILICONE ELASTOMER COMPOSITIONS

[75] Inventors: Takashi Kondou; Takeo Yoshida; Kazutoshi Fujioka, all of Usui-gun, Japan

[73] Assignee: Shin-Etsu Chemical Co., Ltd., Tokyo, Japan

[21] Appl. No.: 426,697

[22] Filed: Apr. 24, 1995

[30] Foreign Application Priority Data

Apr. 25, 1994 [JP] Japan .................... 6-108964

[51] Int. Cl.$^6$ .................................... C08K 9/00
[52] U.S. Cl. ............... 523/216; 523/212; 523/204; 523/210; 528/15
[58] Field of Search ..................... 523/212, 216, 523/204, 210; 528/15

[56] References Cited

U.S. PATENT DOCUMENTS 4,784,879  11/1988  Lee et al. .
5,017,654  5/1991  Togashi et al. ................... 525/100
5,216,104  6/1993  Okami et al. ..................... 528/15

FOREIGN PATENT DOCUMENTS 0347895  12/1989  European Pat. Off. .
53-41707  11/1978  Japan .

OTHER PUBLICATIONS

Abstract of JP 53–41707.

*Primary Examiner*—Melvyn I. Marquis
*Attorney, Agent, or Firm*—Millen, White, Zelano, & Branigan

[57] ABSTRACT

In a heat-curable silicone elastomer composition comprising (A) an organopolysiloxane having at least two aliphatic-unsaturated hydrocarbon groups each bonded to a silicon atom and (B) an organohydrogenpolysiloxane having at least two hydrogen atoms each bonded to a silicon atom, there is blended (C) a hydrosilylating catalyst in the form of a hydrosilylation-promoting compound on a porous filler having a mean particle size of 0.1–100 μm and a pore volume of 0.5–5 cm$^3$/g. The composition is stable during storage at room temperature, but quickly curable at elevated temperatures through hydrosilylation reaction.

19 Claims, No Drawings

HEAT-CURABLE SILICONE ELASTOMER COMPOSITIONS

TECHNICAL FIELD

This invention relates to a heat-curable silicone elastomer composition which is stable during storage at room temperature, but quickly curable at elevated temperatures through hydrosilylation reaction.

BACKGROUND

Heat-curable silicone elastomer compositions which cure through hydrosilylation reaction have been utilized as potting agents, coating agents, adhesives, and liquid injection molding compounds. They have the advantages of a very short curing time and no reaction by-products. However, since they are unstable during storage at room temperature, their components must be divided into two parts during storage, which are mixed on use, leaving a problem of cumbersome operation.

As a solution to this problem, it was recently proposed to add hydrosilylation reaction control agents to silicone elastomer compositions. Exemplary control agents are nitrile compounds, carboxylates, metal compounds such as stannous and mercuric compounds, sulfur compounds, benzotriazoles, acetylene compounds, hydroperoxides, and phosphorus compounds. With these control agents added, silicone elastomer compositions have good long-term shelf stability, but become less curable and take a longer time to complete curing.

Another approach to bypass this problem is to physically embed the hydrosilylation reaction catalyst in a material which is solid near room temperature, but liquid at elevated temperatures. For example, Japanese Patent Publication (JP-B) No. 41707/1978 discloses to add to a silicone elastomer composition a material having a platinum catalyst embedded in a silicone resin which will soften at the curing temperature. This approach can improve the shelf stability of the composition to some extent, but suffers from poor curing because the platinum catalyst embedded in the silicone resin is not quickly released in a short time and can be leached out with the lapse of time.

EP 347859A corresponding to JP-A 4833/1990 discloses microcapsulation of a platinum catalyst with a silicone resin. The platinum catalyst can be leached out to the composition with the lapse of time because of low compatibility. This method is thus less effective for extending the pot life and costly. U.S. Pat No. 4,784,879 corresponding to JP-A 47442/1989 discloses microcapsulation of a platinum catalyst with various organic polymers. The microcapsules are washed with a solvent in which the platinum catalyst is soluble, but not the organic polymer. This method, however, is complex and costly.

Therefore, there is a desire to have a technique capable of improving the shelf stability and curing properties of a heat-curable silicone elastomer composition in an industrially acceptable manner.

SUMMARY OF THE INVENTION

An object of the present invention is to provide a heat-curable silicone elastomer composition which is stable during shelf storage at approximately room temperature, but quickly curable at elevated temperatures through hydrosilylation reaction.

According to the present invention, a heat-curable silicone elastomer composition is obtained by blending (A) an organopolysiloxane having at least two aliphatic unsaturated hydrocarbon groups each bonded to a silicon atom in a molecule, (B) an organohydrogenpolysiloxane having at least two hydrogen atoms each bonded to a silicon atom in a molecule, and (C) a hydrosilylating catalyst in the form of a hydrosilylation-promoting compound borne on a porous filler having a mean particle size of 0.1 to 100 μm and a pore volume of 0.5 to 5 cm³/g. The resulting composition is stable during shelf storage at approximately room temperature, but well curable at elevated temperatures, that is, quickly cures through hydrosilylation reaction.

DESCRIPTION OF PREFERRED EMBODIMENTS

A first essential component (A) of the heat-curable silicone elastomer composition according to the invention is an organopolysiloxane having at least two aliphatic unsaturated hydrocarbon groups each bonded to a silicon atom in a molecule. It is a major component of the inventive composition.

The organopolysiloxane used herein may be of the following compositional formula (1):

$$R^1{}_a R^2{}_b SiO_{(4-a-b)/2} \tag{1}$$

wherein $R^1$ is a monovalent aliphatic unsaturated hydrocarbon group, $R^2$ is a substituted or unsubstituted monovalent hydrocarbon group other than the aliphatic unsaturated hydrocarbon group, and letters a and b are numbers in the range: $0<a\leq1$, $1\leq b<3$, and $1<a+b\leq3$, preferably $0.0005\leq a\leq0.1$, $1.8\leq b\leq2.2$, and $1.9\leq a+b\leq2.25$.

More particularly, $R^1$ in formula (1) is an aliphatic unsaturated hydrocarbon group having 2 to 10 carbon atoms, especially 2 to 4 carbon atoms, for example, alkenyl groups such as vinyl, allyl, propenyl, isopropenyl, butenyl, isobutenyl and hexenyl groups, with the vinyl group being most preferred. $R^2$ is preferably a hydrocarbon group having 1 to 12 carbon atoms, especially 1 to 8 carbon atoms, for example, alkyl groups such as methyl, ethyl, propyl, isopropyl, butyl, isobutyl, tert-butyl, hexyl, cyclohexyl, octyl and decyl, aryl groups such as phenyl and tolyl, aralkyl groups such as benzyl and phenylethyl, and substituted ones of these groups wherein some or all of the hydrogen atoms are replaced by halogen atoms (e.g., chloro, bromo, and fluoro) and cyano groups such as chloromethyl, bromoethyl, trifluoropropyl and cyanoethyl, with the methyl, phenyl and trifluoropropyl groups being most preferred. In formula (1), the substituents represented by each of $R^1$ and $R^2$ may be identical or different. It is essential that two or more aliphatic unsaturated hydrocarbon groups such as alkenyl groups be contained in a molecule. The organopolysiloxane is generally a linear diorganopolysiloxane having a backbone consisting essentially of recurring diorganosiloxane units and blocked with a triorganosiloxy group at either end although a branched or cyclic one containing a $R^1 SiO_{3/2}$, $R^2 SiO_{3/2}$ or $SiO_{4/2}$ unit is acceptable. The aliphatic unsaturated hydrocarbon group contained in the organopolysiloxane molecule may be bonded to any silicon atom at the end or intermediate of its molecular chain although one having an aliphatic unsaturated hydrocarbon group bonded to the silicon atom at either molecular chain end is desirable from the standpoints of curing rate and cured physical properties. The organopolysiloxane preferably has an average degree of polymerization (that is, the number of silicon atoms in a molecule) of at least 20, typically about 20 to about 5,000 and a viscosity of about 10 to 1,000,000 cs at 25° C., especially about 100 to 100,000 cs at 25° C.

A second component (B) is an organohydrogenpolysiloxane having at least two hydrogen atoms each bonded to a silicon atom in a molecule. It is a crosslinking agent for the organopolysiloxane (A). It is preferably of the following compositional formula (2):

$$R^3{}_c H_d SiO_{(4-c-d)/2} \quad (2)$$

wherein $R^3$ is a substituted or unsubstituted monovalent hydrocarbon group and letters c and d are numbers in the range: $1 \leq c \leq 2.2$, $0.002 \leq d \leq 1$, and $1 \leq c+d \leq 3$, preferably $1 < c \leq 2$, $0.01 \leq d < 1$, and $1.8 \leq c+d \leq 2.5$.

In formula (2), $R^3$ is preferably a hydrocarbon group as exemplified for $R^2$, but exclusive of aliphatic unsaturated bond-bearing ones, typically having 1 to 8 carbon atoms, especially 1 to 4 carbon atoms, for example, alkyl groups such as methyl, ethyl, propyl, and butyl, aryl groups such as phenyl and tolyl, and substituted ones of these groups wherein some or all of the hydrogen atoms are replaced by halogen atoms and cyano groups such as chloromethyl, trifluoropropyl and cyanoethyl. The organohydrogenpolysiloxane is generally linear although it may partially contain a branched or cyclic skeleton. It preferably has an average degree of polymerization (that is, the number of silicon atoms in a molecule) of 3 to 300.

The organohydrogenpolysiloxane contains at least two, preferably at least three (e.g., 3 to about 100) hydrogen atoms each bonded to a silicon atom (that is, SiH groups) in a molecule. These hydrogen atoms may be bonded to any silicon atom at the end of or intermediate in the molecular chain or both.

The organohydrogenpolysiloxane is preferably blended such that the molar ratio of the hydrogen atom attached to a silicon atom (i.e., SiH group) in a molecule of organohydrogenpolysiloxane (B) to the aliphatic unsaturated hydrocarbon group attached to a silicon atom in a molecule of organopolysiloxane (A) may range from 10:1 to 1:10, especially from 3:1 to 1:3.

A third essential component (C) is a hydrosilylating catalyst in the form of a hydrosilylation-promoting compound on a porous filler. This catalyst functions to promote crosslinking between the aliphatic unsaturated hydrocarbon group attached to a silicon atom in component (A) and the hydrogen atom attached to a silicon atom in component (B) through hydrosilylation reaction.

The hydrosilylation-promoting compound may be selected from well-known compounds including platinum group metal compounds such as platinum, rhodium and palladium compounds, with the platinum catalysts being preferred. These compounds may be used with or without diluting with suitable solvents such as alcohols, aromatic compounds, hydrocarbons, ketones, and chlorinated compounds.

The porous filler which carries the hydrosilylation-promoting compound should have a mean particle size of 0.1 to 100 μm, especially 1 to 50 μm. Fillers with a mean particle size of less than 0.1 μm have difficulty carrying the catalytic compound or fail to provide a satisfactory catalytic function. Fillers with a mean particle size of more than 100 μm can adversely affect the physical properties of a cured silicone elastomer composition.

The porous filler should have a pore volume of 0.5 to 5 cm³/g, especially 1 to 4 cm³/g. Fillers having a pore volume of less than 0.5 cm³/g have difficulty carrying the catalytic compound so that the silicone elastomer composition is little increased in pot life. With a pore volume of more than 5 cm³/g, a filler itself raises a problem of strength which would adversely affect the physical properties of a cured silicone elastomer composition.

Examples of the porous filler used herein include diatomaceous earth, silica, and metal oxides such as alumina and titanium oxide.

The hydrosilylation-promoting compound is applied to the porous filler by any desired method. One exemplary process involves suspending the filler in a solvent, adding the catalytic compound to the suspension and ripening the suspension at 50 to 100° C. It is simple and thus preferred. Depending on the type of hydrosilylation-promoting compound, the filler may be treated on the surface with a silylating agent to be hydrophobic. Exemplary silylating agents are organochlorosilanes such as methylchlorosilanes including methyltrichlorosilane, dimethyldichlorosilane and trimethylchlorosilane; organosilazanes such as organodisilazanes including hexamethyldisilazane; organodisiloxanes such as hexamethyldfsiloxane and octamethylcyclotetrasiloxane; and cyclosiloxanes. The reason is that highly polar hydrosilyl groups are present at the filler surface. If a compound having a hydrophobic ligand is applied to the filler as such, they would act in a repulsive manner because of opposite polarity. Then the compound cannot be effectively carried on the filler. Treating the filler to have a hydrophobic surface would bring its polarity sufficiently closer to that of the compound to ensure that the compound is carried on the filler.

According to the present invention, carrying the hydrosilylation-promoting compound on the porous filler is sufficient to prolong the pot life of the silicone elastomer composition. If desired, the filler having the hydrosilylation-promoting compound borne thereon may be coated with a silicone resin or the like. This will further prolong the pot life of the composition.

The silicone resin used herein preferably has a melting or softening point in the range of 40 to 150° C., especially 60° to 130° C. With a melting or softening point of lower than 40° C., the catalyst component would be leached out from the silicone resin during shelf storage of the composition, leading to storage instability. A silicone resin with a melting or softening point of higher then 150° C. would not quickly melt or soften upon heat curing of the composition, preventing leaching of the catalyst component and thus inhibiting effective curing.

From the aspect that the silicone resin is effectively dispersed in the composition without being dissolved in another component therein, the silicone resin is preferably of the following average compositional formula (3):

$$R^4{}_e SiO_{(4-e)/2} \quad (3)$$

wherein $R^4$, which may be identical or different, is a substituted or unsubstituted monovalent hydrocarbon group having 1 to 12 carbon atoms, especially 1 to 8 carbon atoms, but free of an aliphatic hydrocarbon group and letter e is a number of 0.8 to 1.8, preferably 1 to 1.5. Examples of the monovalent hydrocarbon group represented by $R^4$ are the same as exemplified for $R^2$. Preferably at least 50 mol % of the hydrocarbon group represented by $R^4$ is a phenyl group or fluorinated group. The silicone resin may have a linear, branched or network molecular structure and preferably has a degree of polymerization of at least 20. Especially preferred are silicone resins of branched or reticulated structure containing at least a monoorganosiloxane unit represented by $R^4SiO_{3/2}$ in a molecule or at least a triorganosiloxy unit represented by a $R^4_3SiO_{1/2}$ unit and a $SiO_2$ unit in a molecule.

The hydrosilylating catalyst is added in a conventional catalytic amount. Especially when a platinum group metal compound is used, the catalyst is preferably added to the composition such that the composition may contain 0.1 to 500 parts by million, especially 1 to 100 parts per million of platinum group metal.

In addition to the above-mentioned essential components, any desired component may be optionally blended in the silicone elastomer composition according to the invention. Such optional components include conventional hydrosilylation reaction control agents, for example, nitrogenous compounds such as tetramethylene diamine and benzotriazole, acetylene compounds such as ethynyl cyclohexanol and propargyl alcohol, hydroperoxides, phosphorus compounds such as triphenylphosphine, nitrile compounds, carboxylates, metal compounds such as stannous and mercuric compounds, and sulfur compounds; fillers such as silica fines and calcium carbonate, heat resistance enhancers such as iron oxide and cerium oxide, flame retardants such as carbon black, tackifiers, and thixotropic agents. These optional components may be blended in conventional amounts insofar as the benefits of the invention are not impaired.

EXAMPLE

Examples of the present invention are given below together with Comparative Examples by way of illustration and not by way of limitation.

Synthetic Example 1

A flask equipped with a stirrer, thermometer, and reflux condenser was charged with 400 g of toluene and 150 g of Radiolite Microfine (trade name of diatomaceous earth commercially available from Showa Chemical Industry K.K.) having a mean particle size of 10.3 μm and a pore volume of 2.3 cm³/g. Stirring at room temperature resulted in a suspension. To the suspension, 7.5 g of a butanol solution of chloroplatinic acid (adjusted to a platinum concentration of 1%) was added dropwise. The suspension was stirred at 70° C. for one hour. The solvent was stripped off at 70° C. in vacuum. The residue was evaporated to dryness at 40° C. in vacuum for 8 hours, yielding diatomaceous earth having platinum borne thereon (having a platinum concentration of 0.1%). This is designated Catalyst 1.

Synthetic Example 2

The procedure of Synthetic Example 1 was repeated. The filler used herein was 150 g of Radiolite Microfine (Showa Chemical Industry K.K., the same as in Synthetic Example 1) which had been silylated with hexamethyldisilazane to be hydrophobic. To the suspension was added dropwise 15 g of a toluene solution of a platinum complex having divinyltetramethyldisiloxane as a ligand (adjusted to a platinum concentration of 0.5%). There was obtained diatomaceous earth having platinum borne thereon, which is designated Catalyst 2.

Synthetic Example 3

Using a spiral flow coating equipment (manufactured by Freund Industry K.K.), Catalyst 1 obtained in Synthetic Example 1 was coated with a silicone resin ($C_6H_5SiO_{3/2}$ unit 70 mol %, $C_3H_7SiO_{3/2}$ unit 30 mol %) having a softening point of 83° C. The resulting catalyst is designated Catalyst 3.

Synthetic Example 4

In 150 g of dichloromethane were dissolved 30 g of a toluene solution of a platinum complex having divinyltetramethyldisiloxane as a ligand (adjusted to a platinum concentration of 0.5%) and 30 g of the same silicone resin containing 70 mol % of phenyl as used in Synthetic Example 3. The solution was spray dried, obtaining 20 g of silicone resin fine particles containing the platinum catalyst (adjusted to a platinum concentration of 0.5%). This is designated Catalyst 4.

Synthetic Example 5

The procedure of Synthetic Example 1 was repeated except that the filler used herein was 150 g of AMT-Silica 300 BTE (commercially available from Mizusawa Chemical Industry K.K.) having a mean particle size of 3.56 μm and a pore volume of 0.26 cm³/g. There was obtained a catalyst having a platinum concentration of 0.1%, which is designated Catalyst 5.

Example 1

A base compound was prepared by blending 900 g of α,ω-divinyldimethylpolysiloxane blocked with a vinyldimethylsilyl group at each end having a viscosity of 10,000 cs at 25° C. with 300 g of fumed silica having a specific surface area of 150 m²/g which had been surface treated with hexamethyldisilazane to be hydrophobic. To 120 g of the base compound were added 1.24 g of a methylhydrogenpolysiloxane represented by $Me_3SiO-(Me_2SiO)_{18}-(MeHSiO)_{20}-SiMe_3$ wherein Me is methyl and 0.02 g of a 50% toluene solution of ethynylcyclohexanol. They were mixed until the mixture became uniform. This is designated Silicone Base 1.

To 121.26 g of Silicone Base 1 was added 0.6 g of Catalyst 1 obtained in Synthetic Example 1. They were uniformly agitated and mixed to form a silicone composition.

Example 2

To 121.26 g of Silicone Base 1 was added 0.6 g of Catalyst 2 obtained in Synthetic Example 2. They were uniformly agitated and mixed to form a silicone composition.

Example 3

To 121.26 g of Silicone Base 1 was added 0.6 g of Catalyst 3 obtained in Synthetic Example 3. They were uniformly agitated and mixed to form a silicone composition.

Comparative Example 1

To 121.26 g of Silicone Base 1 was added 0.06 g of a butanol solution of chloroplatinic acid (adjusted to a platinum concentration of 1%). They were uniformly agitated and mixed to form a silicone composition.

Comparative Example 2

To 121.26 g of Silicone Base 1 was added 0.6 g of Catalyst 4 obtained in Synthetic Example 4. They were uniformly agitated and mixed to form a silicone composition.

Comparative Example 3

To 121.26 g of Silicone Base 1 was added 0.6 g of Catalyst 5 obtained in Synthetic Example 5. They were uniformly agitated and mixed to form a silicone composition.

These silicone compositions were examined for curing property and pot life. While a silicone composition was cured at 150° C., the torque was measured by means of a rheometer (manufactured by Toyo Seiki K.K.) at an arc of 3°. T10 and T90 are the times (sec.) passed when the torque reached 10% and 90% of the torque available after 2 minutes of curing. The pot life was the time (days) passed until a silicone composition gelled at 25° C. and 40° C. (sealed condition).

The results are shown in Table 1.

TABLE 1

|  | Example | | | Comparative Example | | |
|---|---|---|---|---|---|---|
|  | 1 | 2 | 3 | 1 | 2 | 3 |
| T10 (sec.) | 20 | 24 | 45 | 8 | 13 | 10 |
| T90 (sec.) | 52 | 60 | 75 | 22 | 42 | 26 |
| Pot life at 25° C. (day) | 21 | 20 | 115 | 0 | 14 | 1 |
| Pot life at 40° C. (day) | 8 | 9 | 31 | 0 | 5 | 0 |

It is evident from Table 1 that heat-curable silicone elastomer compositions within the scope of the invention are fully stable during shelf storage at approximately room temperature, but effectively curable at elevated temperatures.

There has been described a heat-curable silicone elastomer composition which is kept stable during shelf storage at approximately room temperature, but remains curable at elevated temperatures. By heating, it quickly cures through hydrosilylation reaction. It is widely utilized as potting agents, coating agents, adhesives, and liquid injection molding compounds.

Japanese Patent Application No. 108964/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A heat-curable silicone elastomer composition comprising (A) an organopolysiloxane having at least two aliphatic unsaturated hydrocarbon groups each bonded to a silicon atom in a molecule, (B) an organohydrogenpolysiloxane having at least two hydrogen atoms each bonded to a silicon atom in a molecule, and (C) a hydrosilylating catalyst comprising a hydrosilylation-promoting compound on a porous filler having a mean particle size of 0.1 to 100 μm and a pore volume of 0.5 to 4 cm³/g.

2. The composition of claim 1 wherein said filler is hydrophobic.

3. The composition of claim 1 wherein the filler having the hydrosilylation-promoting compound thereon is coated with a silicone resin having a melting or softening point of 40 to 150° C.

4. The composition of claim 2 wherein the filler having the hydrosilylation-promoting compound thereon is coated with a silicone resin having a melting or softening point of 40 to 150° C.

5. The composition of claim 1, wherein the organopolysiloxane, (A), is of the following formula (1):

$$R^1{}_a R^2{}_b SiO_{(4-a-b)/2} \qquad (1)$$

wherein $R^1$ is a monovalent aliphatic unsaturated hydrocarbon group of 2 to 10 carbon atoms, $R^2$ is a halogen- or cyano-substituted or unsubstituted monovalent hydrocarbon group of 1 to 12 carbon atoms excluding unsaturated hydrocarbon groups and a and b are numbers satisfying the following equations: $0<a\leq 1$, $1\leq b<3$ and $1<a+b\leq 3$.

6. The composition of claim 1, wherein the organopolysiloxane, (A), has a viscosity of about 10 to 1,000,000 cs at 25° C.

7. The composition of claim 1, wherein the organohydrogenpolysiloxane, (B), is of the following formula (2):

$$R^3{}_c H_d SiO_{(4-c-d)/2} \qquad (2)$$

wherein $R^3$ is a halogen- or cyano-substituted or unsubstituted monovalent hydrocarbon group of 1 to 8 carbon atoms excluding unsaturated hydrocarbon groups and c and d are numbers satisfying the following equations: $1\leq c\leq 2.2$, $0.002\leq d\leq 1$ and $1\leq c+d\leq 3$.

8. The composition of claim 1, wherein the organohydrogenpolysiloxane, (B), has an average degree of polymerization of 3 to 300.

9. The composition of claim 1, wherein the amounts of organopolysiloxane, (A), and organohydrogenpolysiloxane, (B), in the composition are such that the molar ratio of hydrogen atoms bonded to silicon atoms in the organohydrogenpolysiloxane, (B), to aliphatic unsaturated hydrocarbon groups bonded to silicon atoms in the organopolysiloxane, (A), is from 10:1 to 1:10.

10. The composition of claim 1, wherein the hydrosilylation-promoting compound is a platinum group metal compound.

11. The composition of claim 1, wherein the porous filler has a mean particle size of 1 to 50 μm and a pore volume of 1 to 4 cm³/g.

12. The composition of claim 1, wherein the porous filler is diatomaceous earth, silica or a metal oxide.

13. The composition of claim 1, wherein the porous filler is alumina or titanium oxide.

14. The composition of claim 3, wherein the silicone resin has a melting or softening point of 60 to 130° C.

15. The composition of claim 3, wherein the silicone resin has the average compositional formula (3):

$$R^4{}_e SiO_{(4-e)/2} \qquad (3)$$

wherein $R^4$ is a halogen- or cyano-substituted or unsubstituted monovalent hydrocarbon group of 1 to 12 carbon atoms excluding unsaturated hydrocarbon groups and e is a number from 0.8 to 1.8.

16. The composition of claim 15, wherein at least 50 mol % of the $R^4$ groups are phenyl groups or fluoro-substituted groups.

17. The composition of claim 3, wherein the silicone resin has a branched structure.

18. The composition of claim 10, wherein the hydrosilylating catalyst is present in the composition such that the composition contains 0.1 to 500 parts by million of platinum group metal.

19. The composition of claim 2, wherein the filler is made hydrophobic by treatment with a silylating agent.

* * * * *